Figure 1:
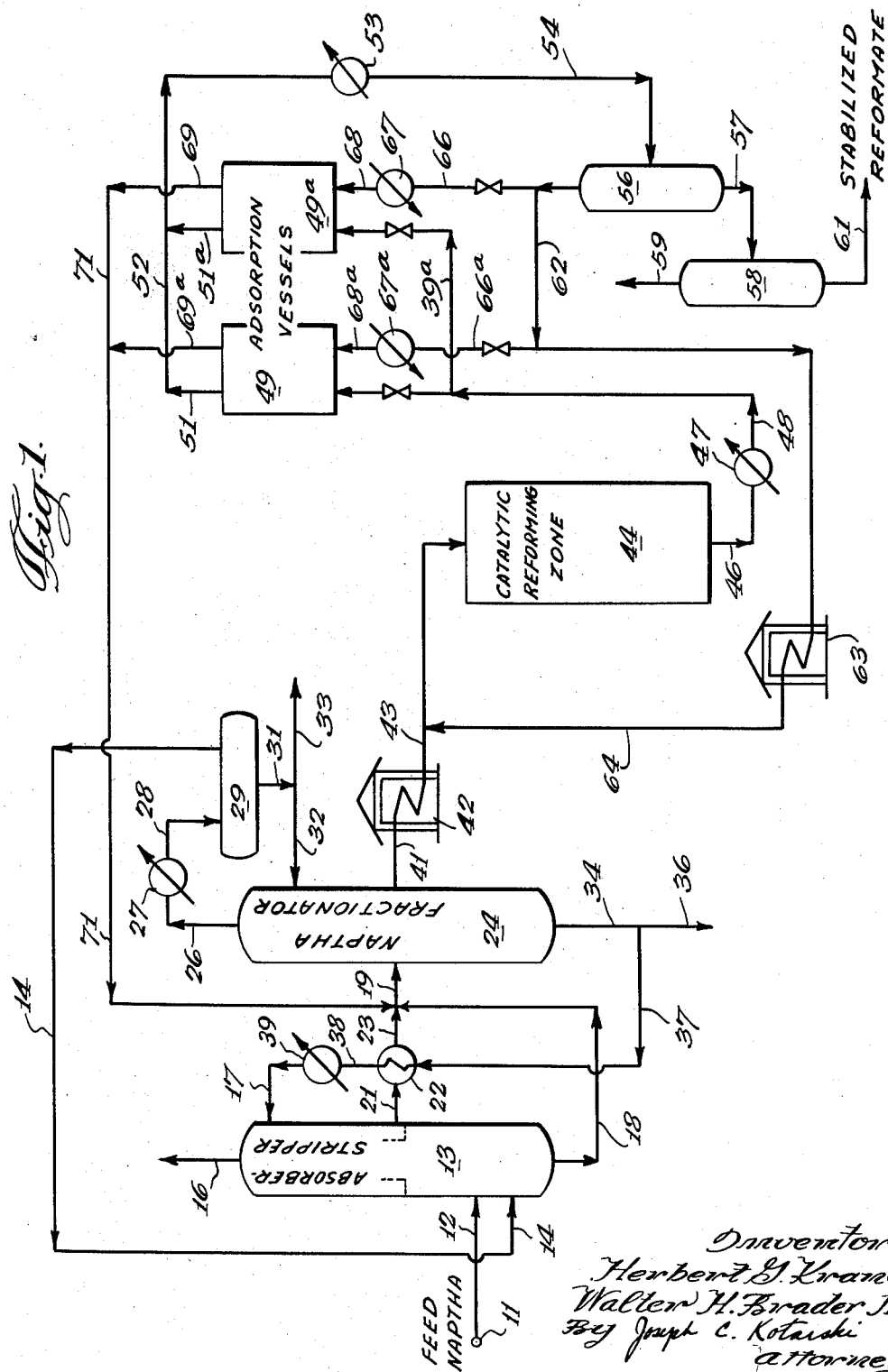

April 16, 1963

H. G. KRANE ET AL 3,085,972

PRODUCTION OF HIGH OCTANE GASOLINE

Filed July 31, 1956

2 Sheets-Sheet 1

Inventors
Herbert G. Krane
Walter H. Brader Jr.
By Joseph C. Kotarski
Attorney

April 16, 1963 H. G. KRANE ET AL 3,085,972
PRODUCTION OF HIGH OCTANE GASOLINE
Filed July 31, 1956 2 Sheets-Sheet 2

Inventor
Herbert G. Krane
Walter H. Brader Jr
By Joseph C. Kotarski attorney

United States Patent Office 3,085,972
Patented Apr. 16, 1963

3,085,972
PRODUCTION OF HIGH OCTANE GASOLINE
Herbert G. Krane, Hammond, and Walter H. Brader, Jr., Crown Point, Ind., assignors to Standard Oil Company, Chicago, Ill., a corporation of Indiana
Filed July 31, 1956, Ser. No. 601,319
7 Claims. (Cl. 208—99)

This invention relates to improvements in the production of high octane gasoline by catalytic reforming. More particularly, it contemplates an integrated process whereby a high yield of 100+ octane reformate is produced by reforming a relatively low octane naphtha charge stock to a severity limited to above about 90 CFR–R octane clear in order to provide substantial economies as well as improved flexibility with respect to feed stocks, selection of catalyst and process conditions.

Steadily increasing octane levels for both premium and regular gasoline have created serious refining problems. As the octane requirements for premium gasoline reach the 98+ CFR–R level, the feasibility of catalytic gasoline as a major premium base stock is reached because catalytic gasoline rarely exceeds about 92–93 CFR–R clear and is not high enough in blending octane to blend up to above the 97 level in leaded gasoline. Moreover, as the level of reforming severity is lifted to meet premium blending standards instead of regular or pool blending standards, reforming costs are greatly magnified. There is a pronounced drop-off in recoverable liquid yield of reformate as reforming severity is increased. Hence, there is an effective decrease in reforming plant capacity. Reforming catalyst life also is sharply reduced as severity is increased. The operating costs per barrel are increased, and since catalyst cost is a major cost factor, the effect is a significantly increasing factor in the incremental cost of the higher octane gasoline. Space velocity (the rate of flow of feed in units of feed flow per unit of catalyst charge) must be reduced to achieve higher octane levels with the same catalyst so that again plant capacity is lost, or catalyst inventory must be significantly increased.

Investment in operating costs for reforming have been additionally increased by the need for hydrofining facilities to remove sulfur compounds from the reformer feed stocks. The presence of hydrogen sulfide, either in the feed or in the hydrogen recycle gas, causes corrosion of the reforming equipment and contamination of the catalyst with iron sulfide, eventual deactivation of the catalyst (in regenerative systems), and consequent lowering of yield and/or octane number of the reformate. While scrubbing of the hydrogen recycle gas with an alkali solution to remove $H_2S$ prior to recycling hydrogen to the reforming zone can be practiced when the sulfur content of the feed naphtha is of the order of 0.05 to 0.1 weight percent or lower, recycle gas scrubbing is an expensive operation because of the need for a scrubbing tower and attendant fractionation facilities. If recycle gas scrubbing is used, additional facilities are required for drying the recycle hydrogen gas since the presence of water in the reaction zone reduces the yield of reformate.

An object of this invention is to provide a process which maximizes the barrel-octanes at any level required for the production of high octane gasoline such as 100+ CFR–R motor fuel. Another object is to reduce the cost of incremental increases in the octane level of premium gasoline and of the over-all gasoline pool. Alternatively, costs can be reduced for attaining given octane goals. A further object is to provide a feasible integrated reforming process which minimizes the capital investment and operating costs for producing high octane reformate of the order of 90 to 100+ CFR–R and which does not require the expensive hydrofining or recycle hydrogen scrubbing and recycle gas drying systems ordinarily needed. An additional object is to provide an inexpensive means for removing low octane components from catalytic reformate and converting such components into higher octane products by means of an integrated system which reduces the heat load required in the feed naphtha fractionation facilities. A still further object is to provide a highly economic means for octane upgrading beyond design and/or catalyst limits in particular instances of installed capacity.

According to the invention, high octane reformate e.g. 100+ CFR–R clear, is produced in high yields by restricting the reforming severity to a level milder than that required for once-through reforming by the integration of naphtha feed fractionation, reforming zone operation, and treatment of the total reformer effluent with an adsorbent capable of removing n-paraffins as well as hydrogen sulfide and water. The feed naphtha is fractionated in conventional feed preparation equipment wherein the proper boiling range naphtha is produced, heavy naphtha being rejected as bottoms and light hydrocarbons as well as hydrogen sulfide etc. being removed overhead. The naphtha charge is reformed in the usual way in the presence of a reforming catalyst and hydrogen gas at a severity providing a $C_5+$ reformate having an octane number of at least about 90 CFR–R clear, advantageously about 95 CFR–R clear or higher. The total effluent from the reforming zone, which consists of reformed hydrocarbons, hydrogen, hydrogen sulfide, and other impurities such as water, ammonia etc., is cooled to a temperature of about 400–500° F. and then contacted with a zeolitic adsorbent which selectively adsorbs straight chain hydrocarbons, hydrogen sulfide, water and other undesired impurities. The vapors of the non-adsorbed portion of the total reformer effluent are withdrawn from contact with the adsorbent and partially condensed to separate a hydrogen gas stream from the reformed hydrocarbons. A portion of the hydrogen gas stream is heated and returned to the reforming zone as recycle hydrogen gas purified of $H_2S$, $H_2O$ etc. The reformed hydrocarbons are then stabilized to produce the $C_5+$ reformate which will have a CFR–R octane clear of 2 to 5 units higher than reformate which has not been contacted with the adsorbent. This great improvement in octane number when reforming at such a high severity, is obtained while suffering only the small volumetric loss in $C_5+$ reformate of from 3 to 6 volume percent due to the extraction of straight chain hydrocarbons. When consideration is given to the high octane components produced by recycling the straight chain hydrocarbons, this small volumetric loss is reduced even further i.e. to the neighborhood of 2 to 4 volume percent loss of $C_5+$ reformate. No other method is known whereby such a great improvement in octane number, when reforming to such high octane levels, is obtained while suffering such minor losses in yield. To obtain this same improvement in octane number of the reformate by reforming at the higher severity required would result in yield losses which may be twofold greater and which require the use of as much as twice the amount of reforming catalyst, especially when producing a $C_5+$ reformate of about 100–101 CFR–R clear. The invention may be employed in conjunction with facilities for hydrofining the feed naphtha when its sulfur content is greater than about 0.05 to 0.1 weight percent, and it is most advantageously employed on a feed naphtha whose sulfur content is less than about 0.05 to 0.1 weight percent since hydrofining facilities are then not necessary.

As the adsorbent becomes spent by reason of adsorption of straight chain hydrocarbons and $H_2S$ as well as other impurities, it is regenerated by heating it to a temperature in excess of about 600° F., preferably while stripping with a non-adsorbable gas, whereupon the previously adsorbed components are desorbed. The stripping gas may be flue gas, normally gaseous hydrocarbons, hydrogen or the like. The hot desorbed components as well as the stripping medium are then passed to the naphtha feed fractionation section wherein the light hydrocarbons as well as the $H_2S$, $H_2O$ and other impurities are removed and the straight chain hydrocarbons are returned to the reforming zone for conversion to higher octane components. Because the desorbed components and stripping medium are at a temperature of about 600° F., they reduce the heat load required in the feed fractionation facilities. Increasing the concentration of the straight chain hydrocarbons in the feed to the reforming zone forces a higher degree of conversion of the straight chain components to higher octane branched chain hydrocarbons and aromatic hydrocarbons, because of the chemical equilibria involved.

Figure 2:
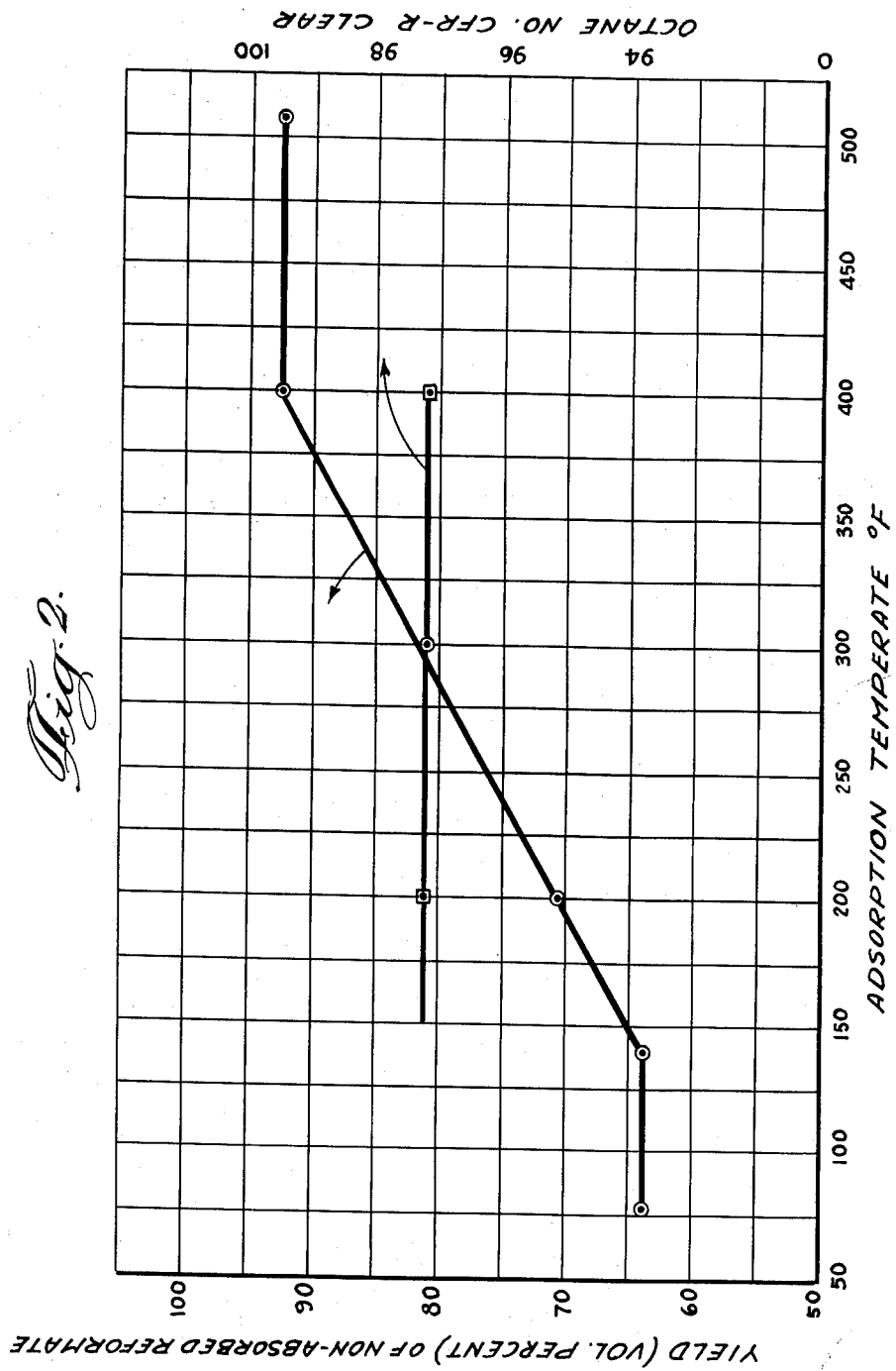

The invention will be more clearly understood from the following description and from the accompanying drawings. FIGURE 1 illustrates in diagrammatic form the process of this invention by which a naphtha is converted in high yield to a reformate having an octane number CFR–R clear in excess of 90 and in which the hydrogen gas is purified of $H_2S$, $H_2O$ etc., prior to recycle to the reforming zone, while recovering straight chain paraffins for further conversion in the reforming zone to higher octane components. FIGURE 2 graphically illustrates the influence of the temperature at which the reformate is contacted with the zeolitic adsorbent and its effect upon the octane number and amount of reformate which is not adsorbed in the adsorption step.

In FIGURE 1, the feed naphtha from source 11 is passed by way of line 12 into absorber-stripper 13 which serves to strip out dissolved oxygen, $H_2S$ etc. from the feed naphtha and absorb wet gases ($C_3$ to $C_5+$ hydrocarbons) from the stripping gases. A small amount of wet gas recovered from the feed fractionation facilities, supplemented with hydrogen gas made in the reforming process is introduced near the bottom of absorber-stripper 13 by way of line 14. Off gases containing oxygen, $H_2S$ etc. are removed overhead and discarded by way of line 16. Heavy naphtha from the feed naphtha fractionation facilities is introduced by way of line 17 into the upper adsorber portion of absorber-stripper 13 to remove condensable hydrocarbons. Naphtha is removed from the bottom stripper section of absorber-stripper 13 and passed by way of line 18 into line 19. The heavy naphtha sponge oil is removed from the upper absorber section of absorber-stripper 13 and passed by way of line 21 through heat exchanger 22 wherein it is heated and thence by way of line 23 into line 19. The feed naphtha, heavy naphtha sponge oil containing absorbed wet gases, and straight chain hydrocarbons and desorbing gas obtained from the regeneration of the zeolite absorbent are introduced by way of line 19 into naphtha fractionator 24.

Naphtha fractionator 24 may be operated to produce a heart cut of naphtha boiling over the range of about 100° to 400° F., preferably boiling over the range of about 150° F. (or somewhat higher) to 360° F. In the embodiment illustrated herein the heart cut of the naphtha produced has an ASTM initial boiling point of about 170 F. and an end point of about 360° F. The feed naphtha employed herein has a sulfur content of about 0.05 weight percent or somewhat less and hence it is not necessary that it be hydrofined since treatment of the recycle hydrogen gas with the zeolitic adsorbent removes the undesired hydrogen sulfide which would ordinarily result in a loss in yield and/or octane number of the reformate if the hydrogen sulfide were present in the reforming zone.

Light naphtha, fixed hydrocarbon gases, $H_2S$, $H_2$ etc. is removed overhead from naphtha fractionator 24 and passed by way of line 26 into cooler 27. The partially liquefied stream is then passed by way of line 28 into drum 29 from which a hydrogen-rich wet gas stream containing $H_2S$ etc. is removed overhead and passed by way of line 14 as a portion of the stripping gas introduced into absorber-stripper 13. A liquid stream of light naphtha is removed from drum 29 by way of line 31, a portion thereof being returned by way of line 32 as reflux to the fractionator and the remainder being removed from the system by way of line 33. The heavy naphtha bottoms stream is removed from fractionator 24 by way of line 34 and a portion thereof is discarded from the system by way of line 36. Another portion of the hot heavy naphtha is passed by way of line 37 into heat exchanger 22 wherein it heats up the sponge oil containing absorbed wet gases. After being partially cooled in heat exchanger 22 the heavy naphtha is passed by way of line 38 into cooler 39 and then by way of line 17 as sponge or absorber oil to the upper absorbing section of absorber-stripper 13.

The heart cut naphtha (170–360° F.) is removed from naphtha fractionator 24 and passed by way of line 41 into furnace 42. The heated naphtha is then passed from the furnace by way of line 43 where it is joined with hot purified hydrogen recycle gas and passed into catalytic reforming zone 44. The charge mixture is contacted in the reforming zone with a platinum-alumina catalyst under reforming severity conditions which produces a $C_5+$ reformate having a CFR–R clear octane of at least 90; in the embodiment described herein the reforming severity is sufficient to produce a $C_5+$ reformate of 99 CFR–R clear. The catalyst, reforming conditions etc. will be described in detail later.

The total reformer effluent which is comprised of the reformed hydrocarbons, $H_2$, $H_2S$, $H_2O$ etc. is passed by way of line 46 into cooler 47 wherein it is cooled to a temperature between about 400° to 500° F., specifically about 400° F. in this embodiment. After cooling, the total reformer effluent is passed by way of valved line 48 into adsorption vessel 49. Although as described herein the total reformer effluent is passed into the adsorption vessels, it may previously be partially condensed to separate and remove the reformate fraction boiling above about 270–300° F. which has a relatively low straight chain hydrocarbon content. The $C_5+$ portion of reformate boiling lower than about 270–300° F. will comprise about 35 to 60 liquid volume percent of the total $C_5+$ reformate. Thus by partially condensing and removing the higher boiling fraction of reformate, the amount of material processed through the adsorbent vessels may be reduced by as much as 50% (with substantial savings because of the reduced size of adsorption vessels needed). While still obtaining approximately the same octane improvement upon blending the non-treated higher boiling fraction with the treated lower boiling fraction of reformate. As illustrated herein two adsorption vessels, 49 and 49a are employed although obviously a greater number may be used. These adsorption vessels contain a zeolitic adsorbent capable of adsorbing straight chain hydrocarbons, paraffins and olefins, $H_2S$, $H_2O$ and other impurities from the reformer effluent. In the illustration shown here the zeolitic adsorbent is 5 A. Molecular Sieves which have a composition corresponding to $Ca_2O.Al_2O_3.2SiO_2$, a surface area of about 750 m.$^2$/g., and a pore size not greater than approximately 5 A. While a fixed bed adsorption system is employed herein, it is apparent that a moving bed system or a fluidized bed system may also be used although not necessarily with equivalent result. In the embodiment of the invention shown herein adsorption vessel 49 is being used to treat the total reformer effluent while adsorption vessel 49a is being regenerated for later use.

The total reformer effluent, less the straight chain hydrocarbons, $H_2S$, $H_2O$, etc. is then removed from adsorption vessel 49 by way of line 50 and passed thereby into line 52 and then into cooler 53 wherein its temperature is reduced to about 100 to 150° F. Both adsorption vessels 49 and 49a are provided with means for introducing and removing the reformer effluent, the lines associated with vessel 49a having the same numeral as the counterpart lines associated with vessel 49, except that the suffix "a" is appended thereto. The cooled adsorbent treated effluent is then removed from cooler 53 and passed by way of line 54 into high pressure separator 56 wherein a separation is effected between a hydrogen gas stream and hydrocarbons. The unstabilized reformate is removed as a liquid bottoms from separator 56 and passed by way of line 57 into stabilization unit 58 wherein the light hydrocarbons are removed from the system overhead by way of line 59 and a stabilized high octane reformate is removed by way of line 61. The stabilized reformate has an octane number CFR-R clear of about 100-101, and constitutes about 95-96 volume percent of the total $C_5+$ reformate produced in the reforming zone.

The hydrogen gas, which has been freed of impurities such as $H_2S$, $H_2O$, $NH_3$ etc., is removed from high pressure separator 56 and a portion thereof is returned as recycle hydrogen gas to reforming zone 44 by way of line 62 through furnace 63 and then by way of line 64 into line 43 by which it enters reforming zone 36. Although not shown herein, a portion of the hydrogen make gas may be diverted from line 62 and passed into line 14 for stripping dissolved oxygen, hydrogen sulfide etc. from the feed in absorber-stripper 13. A portion of the excess hydrogen gas (make gas) is diverted from line 62 and passed by way of valved line 66 for use as a desorbing gas in the regeneration of the spent adsorbent contained in adsorption vessel 49a. The make hydrogen gas is heated to a temperature between about 600 and 900° F., herein about 600° F., in heater 67 and then passed by way of line 68 into adsorption vessel 49a which is being regenerated. A similar arrangement is used to provide regeneration facilities for adsorption vessel 49. As illustrated herein the counterpart equipment contains the suffix "a." The hot make hydrogen gas is passed through vessel 49a until it has desorbed the low octane straight chain hydrocarbons, $H_2S$, $H_2O$ and other impurities from the absorbent. The desorbed hydrocarbons, $H_2S$, $H_2O$ and other impurities are removed from vessel 49a and passed by way of line 69 into line 71 by which they are carried into line 19 and thence into naphtha fractionator 24. These hot gases supply heat to the fractionator and the straight chain hydrocarbons boiling above about 170° F. are separated in fractionator 24 and subsequently returned to reforming zone 44 for conversion to higher octane components. The light gases are removed from the system by means of absorber-stripper 13 and fractionator 24 as previously described.

The present invention utilizes the discovery that different hydrocarbon conversion reactions occur in much differing extent as the reforming severity is increased to produce $C_5+$ reformates having a CFR-R octane clear of above about 90. As reforming severity is increased to about the 90 CFR-R octane clear level, the napthene content of reformate is reduced to such a low level that increasing severity further causes only a minor drop in naphthene content of the reformate. It appears that a primary reaction in producing aromatics, at such high reforming severities, is the cyclization and dehydrogenation of paraffins. Unfortunately, as the severity of reforming is increased above 90 CFR-R clear to raise product octane (by maximizing aromatics production) the paraffins are effectively retained in the reaction zone for a longer time and are hydrocracked to a greater extent. The high molecular weight paraffins are hydrocracked repeatedly on down until considerable amounts of light liquid and gases are formed, the light liquid having a low octane and the gases being essentially waste. Furthermore, considerable catalyst is required for the hydrocracking reaction. Incremental octane increases can better be obtained by our process which removes low octane straight chain paraffins from reformate (and thus increases its octane number) and returns them to reforming while still retaining the higher octane branched chain paraffins in the reformate and saving them from being hydrocracked to lower boiling gases and liquids of low octane number.

As indicated above, it is essential that the reforming process conducted in catalytic reforming zone 36 be carried out under conditions of severity resulting in a $C_5+$ reformate of at least about 90 CFR-R clear. Ordinarily, the average reforming reaction temperature should be in the range of about 850° to 1000° F. and the pressure in the range of about 50 to 400 p.s.i.g., advantageously about 200 to 300 p.s.i.g. The recycle hydrogen rate should approximate 1,000 to 10,000 cubic feet per barrel. The space velocity will depend on the activity of the catalyst but ordinarily will be in the range of about 0.1 to 5.0 WHSV. The catalyst may comprise any of the active reforming catalysts such as platinum-on-alumina or platinum-on-silica alumina, molybdenum oxide-alumina or alkalized chromium oxide-alumina. Advantageously, however, the catalyst is of the platinum-alumina type containing about 0.1 to 1.0 weight percent platinum, which affords higher yields of 100 octane gasoline at lower severities than can be obtained with other catalysts such as the molybdena type catalysts, for example. The catalyst can be employed in the form of a fixed bed of pelleted, beaded or extruded particles, or may be employed in the form of a moving bed, or in fluidized form as a finely divided powder. In fixed bed processes, a series of two or more, usually 3 to 5 reactors are used with interheaters between the reactors so that temperature drop due to the endothermic nature of the major reactions can be compensated for. Operating at the desired severity levels and at low pressure requires more or less frequent regeneration of the catalyst. This can be provided by a controlled process for burning off carbon deposits, advantageously followed on occasions by an elevated temperature "soak" with oxygen enriched gas. Advantageously, a "swing" reactor as used in the ultraforming process is provided so that cyclic regeneration can be effected without shutting down the unit.

The fractionation incident to the invention can be conducted with considerable flexibility. For example, it may comprise separation of recycle gas after cooling at approximately reaction pressure followed by stabilization of the condensed reformate, as shown in the drawings, or it may comprise partial condensation of the heavier components of the reformed mixture followed by separation of recycle gas, stabilization and such further fractionation of the lighter components as is desired.

In practicing the invention, the adsorption vessel which remove n-paraffins, $H_2S$, $H_2O$ etc. from the reformate may be operated using suitable adsorbent materials well-known in the art to be useful for this purpose in either a fixed bed operation or a continuous operation such as might employ a moving or fluidized bed of adsorbent. Zeolitic materials, either naturally occurring or synthetic, are used for this purpose. They have rigid three dimensional anionic networks whose maximum dimensions are sufficiently large for the straight chain hydrocarbons to penetrate therein but sufficiently small to exclude other hydrocarbons such as branched-chain and cyclic hydrocarbons. Naturally occurring zeolites such as chabasites or analcite (having part or all of the sodium contained therein replaced by calcium) may be used (see U.S. 2,306,610). Synthetic zeolites such as $4CaO.Al_2O_3.4SiO_2$ whose preparation is described in U.S. 2,442,191 and commercially available 5 A. Molecular Sieves can be used. The latter have a surface area of about 750 m.²/g., a composition corresponding to $Ca_2O.Al_2O_3.2SiO_2$, and a pore size of about 5 A. The adsorption may be carried out at a temperature of about 400° F. to 500° F. until the absorbent has become fully saturated with straight chain hydrocarbons. The adsorbent will usually adsorb from about 0.03 to 0.08 grams of n-paraffins per gram of adsorbent. Thereafter the adsorbent is regenerated for further use by desorbing the straight chain hydrocarbons, $H_2S$, $H_2O$ etc. by heating at an elevated temperature of 600° to 1100° F., preferably about 600° to 800° F. (when subatmospheric pressures are used in the desorption a lower temperature may be employed) with or without stripping by some non-adsorbable inert gas such as the hydrogen, flue gas, or the like. Another method of regenerating the adsorbent consists of passing saturated steam at a temperature of 212° F. or higher which desorbs the hydrocarbons and the passing a non-adsorbable gas such as hydrogen, flue gases etc. through the adsorbent bed at a temperature of 600–800° F. to remove the adsorbed water.

FIGURE 2 is a graphical presentation of experimental data which show the critical importance of carrying out the adsorption step at a temperature of about 400° to 500° F. or somewhat higher. These data were obtained in separate experiments in which about 95 cc. of a $C_5+$ reformate having a clear octane CFR–R of 94.2 were passed down flow through a one-inch tubular flow reactor containing 60 cc. of 5 A. Molecular Sieves at adsorption temperatures which were varied between about 75° and 510° F. and at atmospheric pressures. The non-adsorbed portion of the reformate was measured and its octane determined (CFR–R clear). The yield of the non-adsorbed portion of the reformate, based upon the original reformate charged to the adsorption zone, was calculated. The results of the runs which were made at various adsorption temperatures are shown in Table I which follows:

Table I

| Run No. | Adsorption Temp., ° F. | Yield of Non-Adsorbed Reformate, percent | Octane No. CFR–R— Clear of Non-Adsorbate |
| --- | --- | --- | --- |
| Feed Reformate |  |  | 94.2 |
| 1 | 77 | 64 |  |
| 2 | 140 | 64 |  |
| 3 | 200 | 71 | 97.2 |
| 4 | 300 | 81 |  |
| 5 | 400 | 93 | 97.2 |
| 6 | 512 | 93 |  |

It can be seen from the above table and with even greater clarity from FIGURE 2, wherein the yield of non-adsorbed reformate and its octane number are plotted as the ordinate and the adsorption temperature is plotted as the abscissa, that the amount of reformate adsorbed diminishes as the adsorption temperature is increased. It appears that increased adsorption occurs at the lower temperatures because high octane components, such as aromatics, etc., are adsorbed on the surface of the zeolite adsorbent. This tends to lower the amount of recoverable high octane reformate. At the higher temperatures of 400–500° F., this phenomenon is minimized. As the adsorption temperature reaches about 400° F. the yield of non-adsorbed reformate remains constant. It will be further noted from FIGURE 2 that although the yield of non-adsorbed reformate increases up to a temperature of about 400° F., the octane number of the non-adsorbed reformate remains essentially constant, regardless of the adsorption temperature. Thus by operating the adsorption step at a temperature of about 400° to somewhat over 500° F., the yield of the non-adsorbed reformate, which is improved in octane number by about three units, is maximized.

An additional series of adsorption runs was carried out in the manner outlined above but charging reformate of varied octane number to the adsorbent contacting step to determine whether the octane improvement diminished as the octane number of the reformate charged increased. The results are shown in Table II below:

Table II

| Run No. | Octane No. (CFR–R clear) of Reformate Charged | Octane No. (CFR–R clear) of Non-Adsorbate |
| --- | --- | --- |
| 7 | 92.3 | 96.1 |
| 8 | 94.2 | 97.5 |
| 9 | 94.2 | 97.7 |
| 10 | 99.0 | ¹102.5 |

¹ GM extrapolated number.

The octane number improvement of the non-adsorbed portion remains rather constant, to our surprise, as the octane number of the reformate charged is increased to 99 CFR–R clear. Our invention thus has special advantages when reforming to a severity of around 100 CFR–R clear.

As an example of the advantages of our invention, a yield (based on naphtha charged to the reformer) of 74.0% by volume of 102.5 CFR–R clear $C_5+$ reformate can be obtained (adsorbed straight chain hydrocarbons being recycled to the reformer); whereas if $C_5+$ reformate of 102.5 CFR–R clear is produced on the reformer a yield of only 72.5% by volume is obtained, and in addition this latter reforming operation would require 2.5 fold as much platinum-alumina catalyst as would be needed by our process in producing 102.5 CFR–R clear $C_5+$ reformate. This .5% by volume increase in yield and catalyst costs which are 60% less may provide savings on the order of 20 cents per barrel of naphtha reformer charge; which would amount to a savings on the order of 1.5 million dollars per year on a 20,000 bbl./day reforming operation.

Thus having described our invention, what is claimed is:

1. A combination process which comprises contacting, in a reforming zone, a low octane naphtha charge stock and a recycled hydrogen gas stream substantially free of hydrogen sulfide, with a reforming catalyst under reforming conditions comprising a temperature of about 850 to 1050° F. and a pressure in the range of about 50 to 800 p.s.i.g. to produce effluent vapors containing a $C_5+$ reformate including aromatics and having an octane number of at least 90 CFR–R clear, cooling said effluent vapors to a temperature between about 400° and 500° F., separating the effluent vapors into an adsorbed portion and a non-adsorbed portion by contacting effluent vapors with a zeolitic adsorbent which selectively adsorbs straight chain hydrocarbons and hydrogen sulfide, removing vapors of the non-adsorbed portion from contact with the adsorbent, partially condensing the non-adsorbed vapors to separate a condensate from a hydrogen gas stream substantially free of hydrogen sulfide, recycling a portion of said hydrogen gas stream to the reforming zone, desorbing adsorbed components from the zeolitic adsorbent separating desorbed components into a low boiling stream containing hydrogen sulfide and a higher boiling stream containing straight chain hydrocarbons having at least five carbon atoms per molecule and returning said higher boiling stream to the reforming zone, and recovering a $C_5+$ reformate having an octane number of higher than 90 CFR–R clear from the condensate.

2. The process of claim 1 in which said low octane naphtha has a sulfur content of less than about 0.1 weight percent.

3. The process of claim 1 wherein the reforming catalyst is a platinum-containing reforming catalyst.

4. The process of claim 1 in which the reforming is carried out at a severity sufficient to provide a $C_5+$ reformate of about 100 CFR–R octane clear.

5. The process of claim 1 wherein the effluent vapors from the reforming zone are partially condensed to remove therefrom a fraction boiling above about 270° to 300° F. before contacting the remaining effluent vapors with the zeolitic adsorbent.

6. The process of claim 1 wherein adsorbent is regenerated for further use by using a portion of said hydrogen gas stream to strip a desorbate from the adsorbent at a temperature between about 600° F. and 1100° F., fractionating components including hydrogen sulfide and low boiling hydrocarbons from the desorbate and stripping gas which boil below about 100° F. and recycling components boiling above about 100° F. to the reforming zone.

7. The process of claim 6 including the step or charging a feed naphtha to a naphtha fractionation zone and wherein the desorbate is fractionated in the said naphtha fractionation zone.

References Cited in the file of this patent

UNITED STATES PATENTS

| | | |
|---|---|---|
| 2,522,426 | Black | Sept. 12, 1950 |
| 2,740,751 | Haensel et al. | Apr. 3, 1956 |
| 2,758,062 | Arundale et al. | Aug. 7, 1956 |
| 2,800,428 | Hengstebeck | July 23, 1957 |
| 2,818,449 | Christensen et al. | Dec. 31, 1957 |
| 2,818,455 | Ballard et al. | Dec. 31, 1957 |

OTHER REFERENCES

"Selective Adsorption With Zeolites," page 4786, Chem. & Eng. News, vol. 32, Nov. 29, 1954.